United States Patent [19]

Bagwell

[11] 3,938,861

[45] Feb. 17, 1976

[54] DOOR CONSTRUCTION FOR HOPPER TRAILER

[75] Inventor: James H. Bagwell, Great Bend, Kans.

[73] Assignee: Doonan Trailer Corporation, Great Bend, Kans.

[22] Filed: Sept. 25, 1974

[21] Appl. No.: 509,069

[52] U.S. Cl. ............... 298/27; 105/247; 105/282 P
[51] Int. Cl.$^2$............................................ B61D 7/20
[58] Field of Search ........ 298/24, 27; 105/239, 247, 105/282 P, 294, 305; 222/505, 561

[56] References Cited
UNITED STATES PATENTS

| | | | |
|---|---|---|---|
| 622,909 | 4/1899 | Barney | 105/282 P X |
| 2,753,815 | 7/1956 | Dorey | 105/282 P |
| 3,085,517 | 4/1963 | Smith | 105/305 X |
| 3,530,803 | 9/1970 | Adler | 105/305 X |

Primary Examiner—Frank E. Werner
Attorney, Agent, or Firm—Lowe, Kokjer, Kircher, Wharton & Bowman

[57] ABSTRACT

A hopper bed for grain or the like is provided by the present invention. An opening in the hopper bed is closed by a flat plate structure which is mounted on first and second track components disposed on either side of the opening. A flat flange portion is coupled with the structure on each side in longitudinal alignment with a track component. Each flange portion has a plurality of closely spaced aligned openings which are also aligned with two spur gears. The spur gears are rotated to mesh with the gear track presented by the openings in the flange and thereby reciprocate the plate structure to close or open it. This construction precludes the accumulation of most foreign material in the gear track although any which does accumulate is cleaned out by the action of the gear itself moving in the track.

4 Claims, 4 Drawing Figures

DOOR CONSTRUCTION FOR HOPPER TRAILER

This invention relates to hopper bed constructions generally and, more particularly, to a hopper bed employing an improved delivery door at the hopper opening.

Hopper cars have become increasingly widely used for the purpose of transporting many materials in bulk because of the ease and efficiency with which a hopper car can be unloaded. In nearly all environments where hopper cars are utilized there is a chronic problem of dust and dirt entering working mechanisms. The problem has been accute in many instances involving the means by which the door on a hopper car is moved between its open and closed positions.

The practice heretofore has been to utilize a gear track meshed with a spur gear to open and close hopper car doors in many situations. Such a construction has the advantage of being a relatively inexpensive means and being readily subject to manual operation but is very susceptible to the accumulation of foreign material in the gear track. This is particularly the case with hopper cars utilized over the road where dirt, snow, ice, and even the grain itself often become lodged in the gear track making it unworkable. The only solution heretofore has been to periodically clean the track before any attempt is made to open the hopper car door.

It is, therefore, an object of the present invention to provide a hopper car construction utilizing a gear track for the hopper door which is built so as to substantially preclude the accumulation of foreign material in the gear track.

Another important object of this invention is to provide a hopper car construction utilizing a gear track for the hopper door wherein the track is completely self cleaning and if any foreign material does accumulate in it, it will be forced from the track as the gear moves over it.

Still another aim of this invention is to provide a hopper car construction wherein the gear track for the hopper door is constructed to eliminate the need for projecting teeth and therefore is not subject to teeth breaking under stress.

Still another object of this invention is to provide a gear track construction which is more positive and stronger than a conventional gear track as a result of the fact that openings in a flat plate are utilized instead of gear teeth.

Other objects of the invention will be made clear or become apparent from the following description and claims when read in light of the accompanying drawing wherein:

Figure 1:
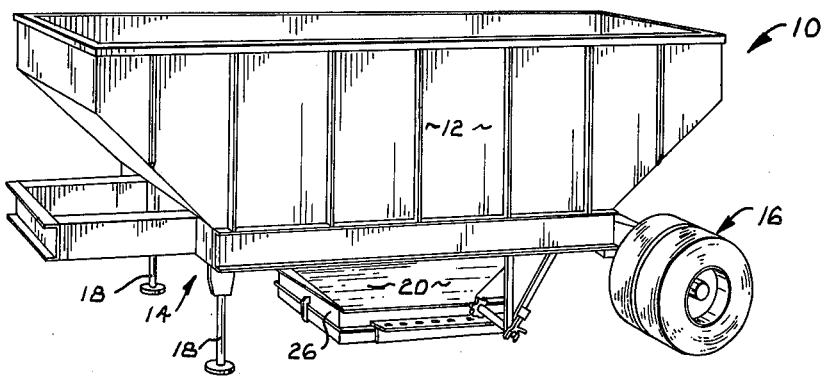
FIG. 1 is a perspective view of a hopper car trailer constructed according to the teachings of the present invention.

Referring initially to FIG. 1, a hopper car vehicle is designated generally by the numeral 10 and includes a hopper bed 12 mounted on a framework 14. The framework is supported at one end by a wheel and axle assembly designated generally by the numeral 16 and at the other end by two foldable standards 18.

Figure 2:
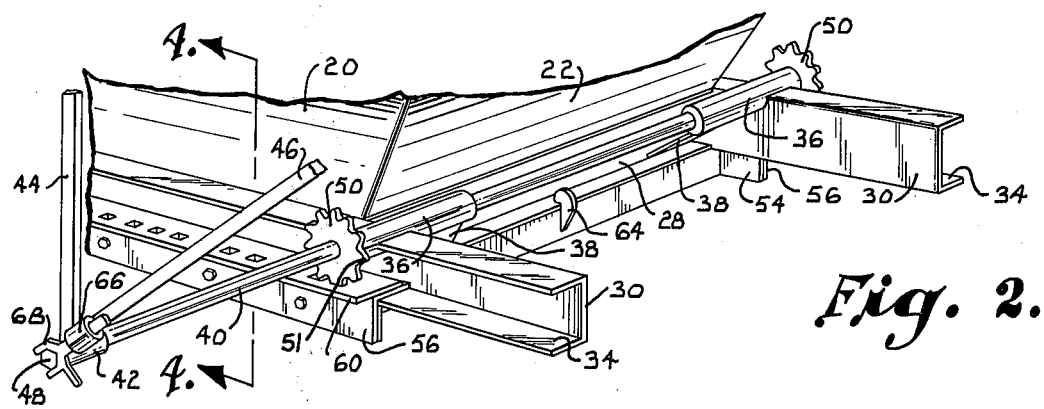
FIG. 2 is a fragmentary perspective view, on an enlarged scale, of the hopper car door construction and mechanism for moving the door between open and closed positions.
Figure 4:
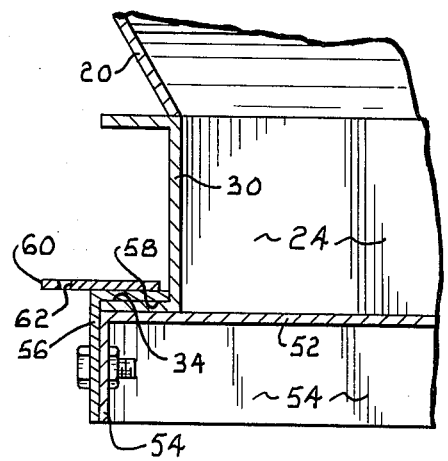
FIG. 4 is a cross-sectional view of the track components and door structure taken along line 4—4 of FIG. 2.

Referring additionally to FIG. 2, bed 12 is formed by two sets of opposed sidewalls 20 and 22. These sidewalls converge as they approach the bottom of the bed and terminate in spaced apart relationship to present a hopper opening 24 (FIG. 4).

Opening 24 is of generally rectangular configuration and is bordered by channel stock 26 and 28 on two opposed sides. The channel stock 26 mounts a C hook 32 for purposes to be made clear hereinafter. The other two sides of opening 24 are bordered by two elongated track components 30 which extend in the longitudinal direction of the trailer bed and project beyond the vertical plane of the side edge of opening 24. As both of the track components 30 are identical only one of the same will be described in detail. Track component 30 is of generally U-shaped cross-sectional configuration with the lower portion of the component forming a L which extends outwardly away from opening 24. The shorter leg of the L presents a flat planar tracking surface 34.

Mounted to one side of hopper bed 12 immediately adjacent opening 24 are sleeves 36 which are rigid with track components 30 and are also rigidly supported by gusset plates 38. Sleeves 36 receive an elongated shaft 40 which extends transversely of components 30 and projects outwardly at one end beyond side 20 of bed 12. The end of shaft 40 is supported by a sleeve 42 which is rigid with braces 44 and 46. The end of shaft 40 terminates in a hex head 48 for purposes to be made clear hereinafter. Rigidly mounted in spaced apart relationship on shaft 40 are two spur gears 50, one of which is mounted outside of each of the sleeves 36.

Opening 24 is closed by a flat plate-like structure 52 of a size at least equal to the size of the opening. Preferably, structure 52 extends beneath the leg of each component 30 which presents surface 34 as illustrated in FIG. 4. The structure 52 is supported around its peripheral edge by a framework 54 which is bolted or otherwise rigidly secured to two opposed track mounting members 56. Each of the members 56 is identical and only one will be described in detail. Each member 56 is of generally T-shaped configuration with one side thereof presenting an L which is complemental to the leg of component 30 which presents surface 34. Thus, member 56 presents a track follower surface 58 which rides along surface 34. The other side of member 56 presents a flange portion 60 integral with and in the same horizontal plane as the leg which presents surface 58. Flange portion 60 is disposed to project outwardly from the vertical plane of the central leg of member 56 and is characterized by a plurality of closely spaced longitudinally aligned openings 62. It is to be noted that the teeth 51 of each of the gears 50 are of a length at least equal to the thickness of flange portion 60 so that the teeth project substantially all the way through openings 62 (See FIG. 3). Disposed at one end of the member 56 is a stop pin 64. Framework 54 also mounts a second C hook 64' disposed in opposed relationship to the first C hook 32.

Disposed on brace 46 is a collar 66 that slidably mounts a Y-shaped locking element 68. The interior face of element 68 is constructed in a complemental hex configuration so as to be received by hex head 48.

In actual use, vehicle 10 is pulled over the road filled with a bulk material such as grain or the like. It is to be understood that appropriate coupling structure, not shown, would be disposed at the front of the vehicle for coupling it with either another trailer or with a pulling vehicle. The area beneath hopper bed 12 is particularly subject to accumulation of foreign material including dirt, ice, grain, small rocks, and any other material which is being hauled in the vehicle. Because of the construction of the gear rack presented by openings 62 in flange portion 60, however, there is only minimal accumulation of foreign objects in the gear rack. Since openings 62 are unobstructed on either side, any material landing on or near flange portion 60 will simply drop through the opening and pass on to the ground without accumulating. Any foreign material which does accumulate in opening 62, however, is cleaned out of the opening before it has an opportunity to interfere with operation of door structure 52. This is accomplished by rotation of spur gears 50 with the teeth on the gears projecting into openings 62 to force foreign material out through the opposite side of the opening.

Figure 3:
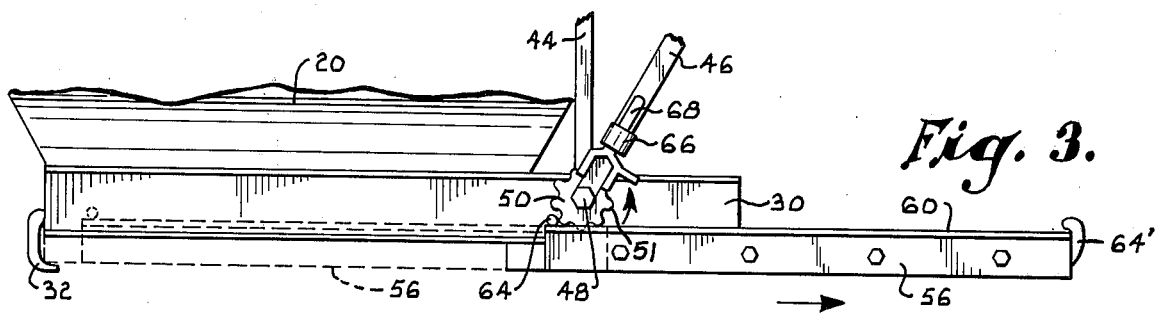
FIG. 3 is a fragmentary side elevational view showing the hopper door in its open position with a partially closed position being illustrated in broken lines.

Structure 52 is held in its closed position by locking element 68 which slips over the end of hex head 48 as best illustrated in FIG. 2. When it is desired to open structure 52, element 68 is moved out of the way as indicated in FIG. 3 and an appropriate ratchet mounted socket is slipped over the end of hex head 48. Rotation of shaft 40 will in turn rotate spur gears 50 to move the track mounting members 56 relative to track components 30 as indicated in FIG. 3. Movement of components 56 relative to members 30 is limited by stop pins 64 disposed at the end of the line of openings 62.

For closing structure 52 the direction of rotation of shaft 40 is reversed and as the structure approaches its fully closed position hook 32 will engage the bottom edge of framework 54 and exert a slight upward force on the structure as movement against the hook is continued to assure a tight closure at one end. The same effect is achieved at the opposite end by hook 64 which engages the flange edge of channel member 28.

It is to be noted that the construction of structure 52 with the complemental disposition of mounting members 56 and track components 30 together with the hook 32 and 64 absolutely precludes any lateral or transverse movement of the door structure. It has been found highly economical to construct a gear track from flat stock, utilizing openings in the stock rather than forming a conventional gear rack with teeth projecting from it. Substantial strength advantages are also obtained by distributing the forces between the gear teeth and the gear rack over a much greater area than is possible with gear teeth projecting from a piece of bar stock. Thus, all of the objectives of the invention are achieved without sacrificing either strength or economy in construction.

Having thus described the invention, I claim:

1. In combination with a land vehicle, hopper construction comprising:
    a hopper bed having an opening in its bottom for the discharge of material;
    first and second track components of L-shaped cross-sectional configuration extending longitudinally on opposite sides of said opening with one leg of each component extending away from the opening;
    closure structure for said opening having a transverse dimension greater than the width of the opening so as to extend beneath said track components;
    first and second mounting members of inverted L-shaped cross-sectional configuration disposed in opposed relationship to said track components and extending longitudinally along opposite sides of said closure structure with one leg of each member substantially overlying said one leg of a corresponding track component,
    said mounting members being rigidly coupled with said closure structure and adapted to move relative to said track components;
    generally planar flange structure having a portion substantially overlying said one leg of at least one of said mounting members and another portion projecting from the said one leg of said one mounting portion;
    said flange structure extending substantially along the length of said one member, being rigidly coupled therewith and having a plurality of longitudinally aligned through openings in said other portion; and
    a spur gear mounted for rotation with its teeth complementally received by the openings in said flange portion whereby rotation of said gear moves said closure structure.

2. The invention of claim 1, wherein the length of the teeth of said spur gear are at least substantially equal to the thickness of said flange structure whereby said teeth extend at least substantially through said openings.

3. The invention of claim 1, wherein is included a second flange structure rigidly coupled with the other of said members, and a second spur gear mounted for rotation on a common shaft with said first spur gear with its teeth received in the openings of said second flange structure.

4. The invention of claim 3, wherein is included first hook means on said hopper bed intermediate said track components and disposed for engagement with the closure structure when the latter is moved into a closed position, said hopper bed terminating in a flange presenting edge in opposed relationship to said first hook means, and second hook means on said structure engageable with said flange presenting edge when the structure is moved to its closed position.

* * * * *